H. W. JUSTUS.
RELIEF VALVE.
APPLICATION FILED JAN. 8, 1921.
1,399,710.
Patented Dec. 6, 1921.
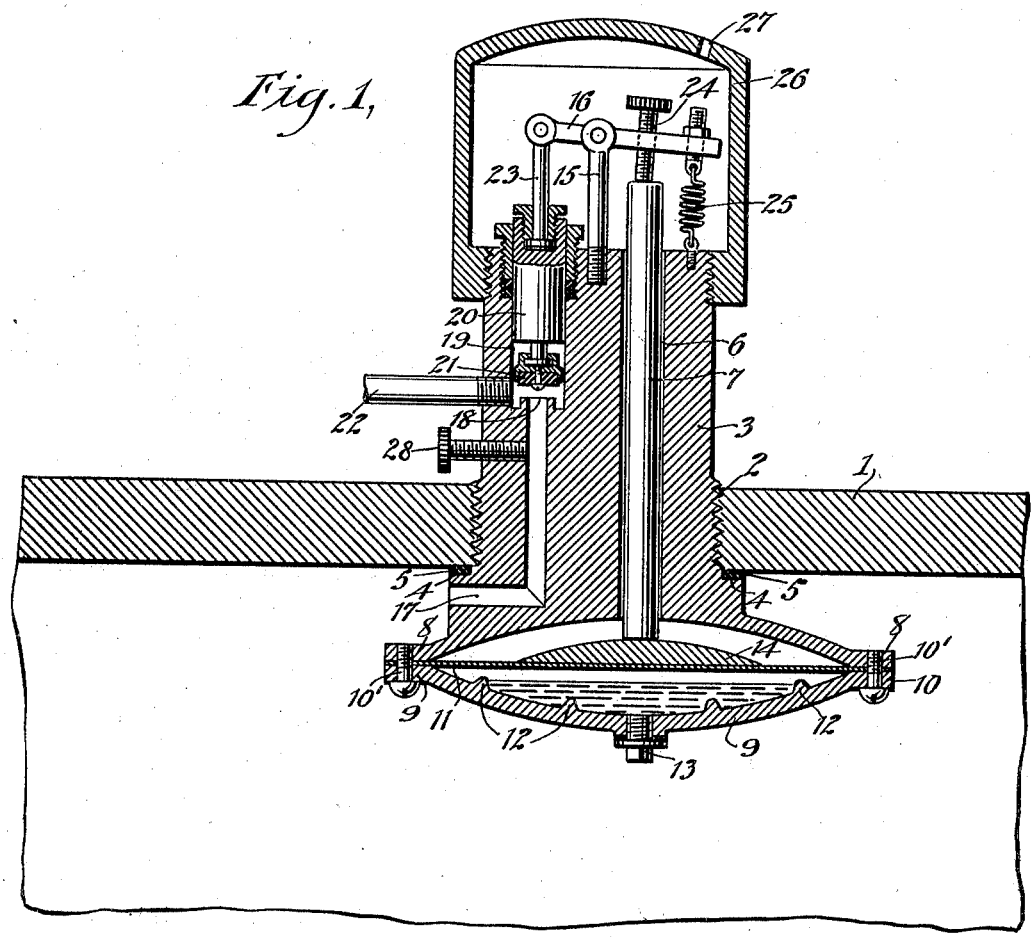
Fig. 1,
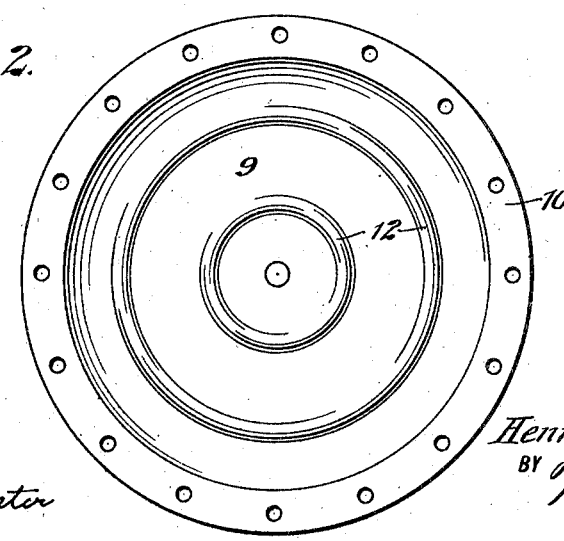
Fig. 2.
WITNESSES
Edw. Thorpe
Franklin J. Foster
INVENTOR
Henry W. Justus
BY
ATTORNEYS

UNITED STATES PATENT OFFICE.

HENRY WILLIAM JUSTUS, OF NAPANOCH, NEW YORK.

RELIEF-VALVE.

1,399,710.     Specification of Letters Patent.     Patented Dec. 6, 1921.

Application filed January 8, 1921. Serial No. 435,895.

*To all whom it may concern:*

Be it known that I, HENRY W. JUSTUS, a citizen of the United States, and a resident of Napanoch, in the county of Ulster and State of New York, have invented a new and Improved Relief-Valve, of which the following is a full, clear, and exact description.

This invention relates to improvements in relief valves, an object of the invention being to provide a valve of this character which will permit the escape of air from a steam system, and which will automatically close and prevent the escape of steam therefrom.

A further object is to provide a diaphragm controlled valve of this character which may be readily applied to a steam system or apparatus, which will be strong and durable in use, which will act quickly, which will be simple and practical in construction, and which will be readily accessible in case it should become necessary to repair the same.

With these and other objects in view the invention consists in certain novel features of construction, and combinations and arrangements of parts, as will be more fully hereinafter described and pointed out in the claims.

In the accompanying drawings:

Figure 1 is a view in longitudinal section illustrating my improved valve attached to a steam chamber.

Fig. 2 is a top plan view of the member 9.

Referring in detail to the drawing, 1 represents the top of a steam chamber or apparatus which is provided with a threaded opening 2. The body 3 of my improved relief valve is in the form of a metal casting and is screwed into the opening 2. An annular shoulder 4 around the body portion serves to clamp a gasket 5 tightly against the under face of the top 1 and insures a snug connection.

The body 3 is formed with a longitudinal bore 6 in which a plunger rod 7 is movable. At its lower end the body 3 is annularly concave and is provided with an annular flange 8. A saucer-like member 9 is also formed with a flange 10 similar to the flange 8, and the two flanges are formed with registering perforations so that when suitable securing devices such as 10' are used the flanges serve to clamp a diaphragm 11 across the center of the compartment formed by the member 9 and the lower end of the body 3.

The member 9 is formed with annular ribs 12 on its inner face so that a maximum of heating surface is provided for heating the liquid which is introduced into the hermetically sealed compartment defined by the diaphragm and this member. A threaded plug 13 in the bottom of the member 9 permits the introduction of water or other liquid into the compartment.

A plunger head or plate 14 at the lower end of the plunger rod 7 rests against the upper face of the diaphragm 11.

A vertical post 15 is screwed into the upper end of the body 1 and a rocker arm or lever 16 is fulcrumed on the upper end of the post. The body portion 3 is formed with an angular air passage 17, the walls of the vertical portion of which terminate at their upper end in a valve seat 18 and the horizontal portion of which opens into the chamber 1. A longitudinal recess 19 in the upper end of the body portion communicating with the passage 17 forms a guideway for an enlarged valve stem 20. At its lower end the valve stem 20 carries a valve 21 adapted to fit the seat 18. An air outlet passage 22 communicates with the recess 19 adjacent the valve seat. The valve stem is pivotally connected through the medium of a rod 23 to one end of the rocker arm 16.

The pivotal movement of the rocker arm in one direction is thus limited by the engagement of the valve with the valve seat. A coil spring 25 operatively connected to the other end of the rocker arm and to the body 1 serves to maintain a set screw 24 carried by the rocker arm in engagement with the upper end of the plunger rod 7.

A cap 26 screws on to the outer or upper end of the body 3 concealing the rocker arm and its associated parts. The cap is provided with a vent 27 and the plunger rod 7 fits loosely within its bore 6 so that the air pressure above the diaphragm 11 is maintained uniform.

The operation is as follows: When steam is introduced into the pipe 1 it will force any air which may be collected in the pipe out through the passages 17 and 22. As the saucer 9 becomes heated it will vaporize the water which it contains and pressure will be exerted on the diaphragm 11 causing the plunger rod 7 to move upwardly against the pressure of the spring 25 and through the medium of the rocker arm and its associated parts firmly seating the valve 21 and closing the passage 17. It will be noted that the steam in the boiler does not act directly on the diaphragm, but is only used to heat the diaphragm actuating medium.

An auxiliary valve in the form of a set screw 28 may be utilized to close the passage 17 if it becomes necessary to repair any of the parts while steam is on. The removable cap 26 will, of course, provide ready access to the working parts of the valve.

The valve may be made to operate more quickly by adjusting the set screw 24 as will be readily understood.

Various slight changes might be made in the general form and arrangement of the parts described without departing from the invention, and hence I do not limit myself to the precise details set forth but consider myself at liberty to make such changes and alterations as fairly fall within the spirit and scope of the appended claims.

I claim:

1. The combination with a steam chamber, of a device of the character stated including a body portion having an air passage therein connecting the chamber with the outside atmosphere, a spring held plunger in the body portion, a diaphragm casing, a diaphragm in the casing operatively connected to the plunger, a valve controlling the outlet passage, and means operatively connecting the valve and plunger, said means comprising a rocker arm operatively connected at one end to the valve, and a set screw carried by the other end of the rocker arm and engageable with the upper end of the plunger rod.

2. The combination with a steam chamber, of a device of the character stated including a body portion having an air passage therein connecting the chamber with the outside atmosphere, a spring held plunger in the body portion, a diaphragm casing, a diaphragm in the casing operatively connected to the plunger, a valve controlling the outlet passage, means operatively connecting the valve and plunger, said means comprising a rocker arm operatively connected at one end to the valve, a set screw carried by the other end of the rocker arm and engageable with the upper end of the plunger rod, a spring exerting pressure on the rocker arm to maintain the set screw in engagement with the plunger rod, and a threaded cap fitting the upper end of the body portion and inclosing the rocker and its associated parts.

3. The combination with a steam chamber, of a device of the character stated, including a body portion having an air passage therein connecting the chamber with the outside atmosphere, a plunger in the body portion, a diaphragm casing, a diaphragm in the casing operatively connected to the plunger, a valve controlling the outlet passage, a rocker arm, means operatively connecting one end of the rocker arm and the valve, a spring exerting pressure on the other end of the rocker arm, an adjustable member carried by the rocker arm and engageable with the upper end of the plunger.

HENRY WILLIAM JUSTUS.